(12) United States Patent  (10) Patent No.: US 8,306,174 B2
Murphy et al.  (45) Date of Patent: Nov. 6, 2012

(54) FRACTIONAL INTERPOLATIVE TIMING ADVANCE AND RETARD CONTROL IN A TRANSCEIVER

(75) Inventors: Thomas Casimir Murphy, St Charles, IL (US); Jingcheng Zhuang, Allen, TX (US); Khurram Waheed, Plano, TX (US); Roman Staszewski, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 863 days.

(21) Appl. No.: 12/411,482

(22) Filed: Mar. 26, 2009

(65) Prior Publication Data

US 2010/0027729 A1   Feb. 4, 2010

Related U.S. Application Data

(60) Provisional application No. 61/084,765, filed on Jul. 30, 2008.

(51) Int. Cl.
  *H04L 7/00* (2006.01)
(52) U.S. Cl. ....................................................... 375/371
(58) Field of Classification Search .................. 375/354, 375/357, 369, 371, 372, 373, 374; 370/395.62, 370/507; 455/265; 702/89; 713/375, 400
See application file for complete search history.

(56) References Cited

U.S. PATENT DOCUMENTS

| | | | |
|---|---|---|---|
| 7,058,089 B2 * | 6/2006 | Franchuk et al. | 370/503 |
| 7,777,576 B2 * | 8/2010 | Waheed et al. | 331/17 |
| 2007/0036254 A1 * | 2/2007 | Kim | 375/354 |
| 2008/0104448 A1 * | 5/2008 | Tamura | 714/40 |
| 2008/0315960 A1 | 12/2008 | Waheed et al. | |

* cited by examiner

*Primary Examiner* — Khanh C Tran
(74) *Attorney, Agent, or Firm* — Ronald O. Neerings; Wade James Brady, III; Frederick J. Telecky, Jr.

(57) ABSTRACT

Transmission of information between user equipment (UE) and base stations in a wireless network occurs using a stream of periodic data. A modem in the UE operates synchronized to a first clock source to produce the stream of periodic data at a chip rate. Transceiver circuitry is synchronized to a variable clock source to receive the stream of data from the first circuitry at a rate according to the variable clock source. A fixed phase relationship is maintained between the variable clock source and the first clock source while the data period is uniform by adjusting the variable clock in response to detected phase errors. Occasionally, one period of the periodic data is changed by a defined amount. The fixed phase relationship is restored over a number of periods in a gradual manner by changing the frequency of the variable clock by an amount. By restoring the phase relationship gradually, quality degradation of the transmitted signal is reduced.

22 Claims, 9 Drawing Sheets

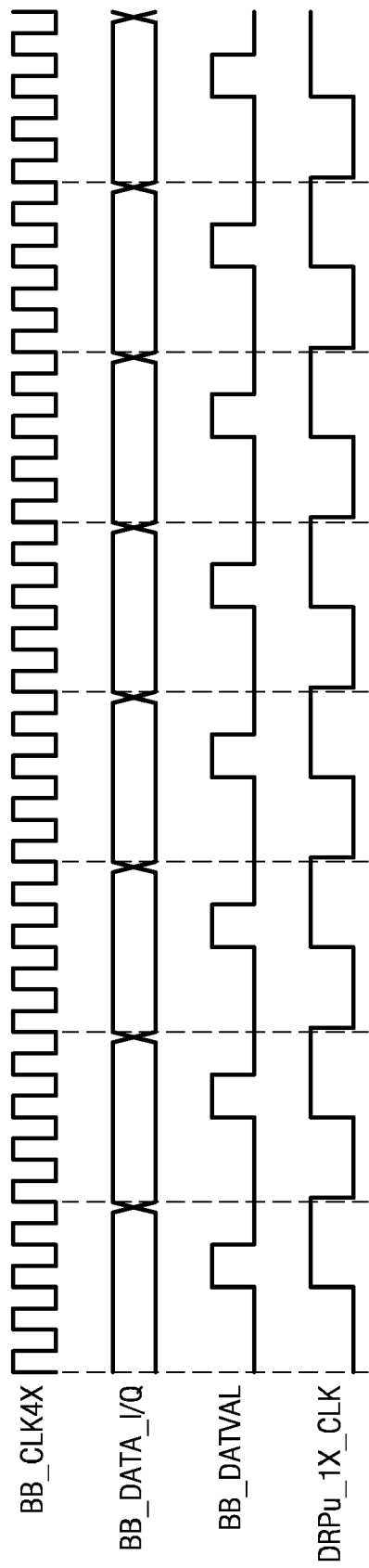
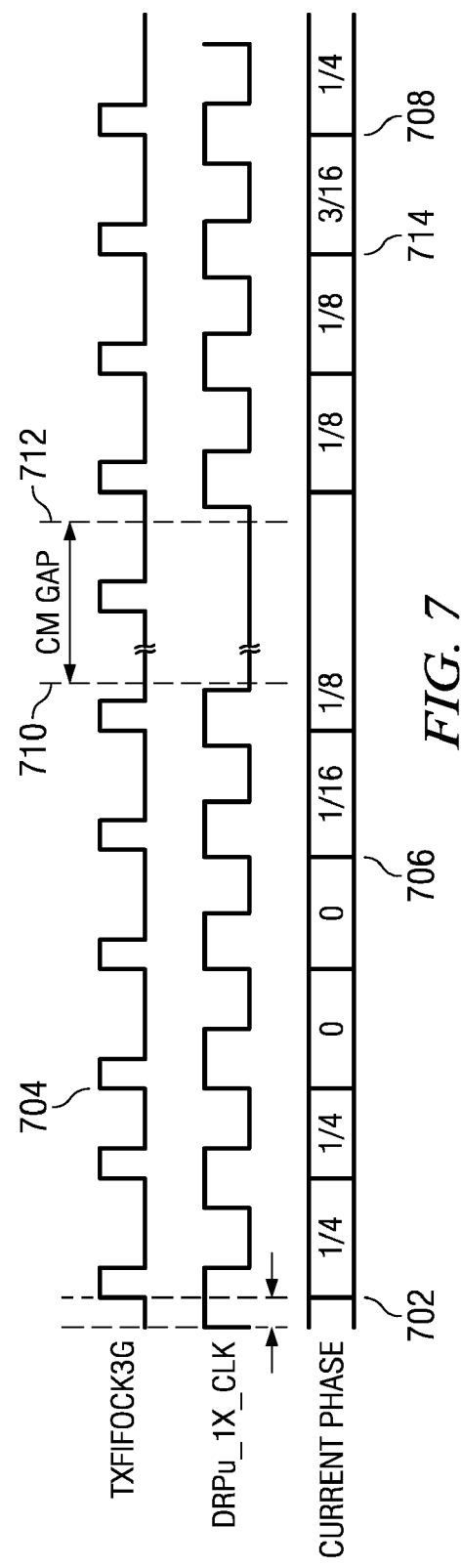
FIG. 4
FIG. 7 ns, GSM/GPRS LoCosto TCS23xx transceivers among other chips. DRP implementation is consistent with the ongoing trend toward RF-CMOS in the cellular area, making it attractive in terms of power consumption, cost, and the integration of multiple radios.

FRACTIONAL INTERPOLATIVE TIMING ADVANCE AND RETARD CONTROL IN A TRANSCEIVER

CLAIM OF PRIORITY UNDER 35 U.S.C. 119(e)

The present application claims priority to and incorporates by reference U.S. Provisional Application No. 61/084,765, filed Jul. 30, 2008, entitled "Method and Apparatus for Fractional Interpolative Timing Advance and Retard Control in a Transceiver."

FIELD OF THE INVENTION

This invention generally relates to wireless cellular communication and in particular to timing advance and retard for signals used in Universal Mobile Telecommunications System (UMTS) cellular telephony using all-digital radio frequency (RF) circuitry.

BACKGROUND OF THE INVENTION

Wireless cellular communication networks incorporate large numbers of mobile user equipment (UEs) and a number of base nodes (NodeBs). A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is typically portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

With each successive cellular phone handset generation, users demand more features in a smaller form factor. Some recent examples include cell phones with integrated Bluetooth, GPS, digital camera, and MP3 functionality. Process shrinks help deliver a cost and size advantage for digital designs with relative ease. However, for analog/RF designs, the immaturity of advanced processes comes with design challenges that may outweigh the intended advantage. In a typical handset, 30 to 40% of handset board space is occupied by analog/RF functionality which cannot be re-designed or migrated to the newer process/technology nodes easily, inhibiting vendor ability to cost effectively add features and reduce footprint.

Digital radio has recently allowed the replacement of space consuming analog RF circuitry with much more compact digital circuitry, thereby facilitating the ability to port designs rapidly to more advanced lithographies. Texas Instruments (TI) has proven this concept with its Digital RF Processor (DRP™) architecture, which it has successfully implemented in production versions of its Bluetooth BRF6xxx transceivers, GSM/GPRS LoCosto TCS23xx transceivers among other chips. DRP implementation is consistent with the ongoing trend toward RF-CMOS in the cellular area, making it attractive in terms of power consumption, cost, and the integration of multiple radios.

Operation of UMTS networks is described in detail in standards published by the 3rd Generation Partnership Project (3GPP), which is a collaboration between groups of telecommunications associations to make a globally applicable third generation (3G) mobile phone system specification within the scope of the International Mobile Telecommunications-2000 project of the International Telecommunication Union (ITU). 3GPP specifications are based on evolved Global System for Mobile Communications (GSM) specifications. 3GPP standardization encompasses Radio, Core Network and Service architecture.

State-of-art wireless radio handset systems (e.g. UMTS) that are required to Advance and/or Retard the transmitted signal. The UMTS standard specifies a maximum ¼ chip Advance/Retard Step Size per 200 ms. As these system support increased data rates, some signal quality degradation is incurred when performing an Advance or Retard.

BRIEF DESCRIPTION OF THE DRAWINGS

Particular embodiments in accordance with the invention will now be described, by way of example only, and with reference to the accompanying drawings:

FIG. 4 is timing plots illustrating normal timing of data signals received by the DTX of FIG. 3;

FIGS. 5-7 illustrate interpolative timing advance and control performed by the DTX;

DETAILED DESCRIPTION OF EMBODIMENTS OF THE INVENTION

State-of-art wireless radio handset systems (e.g. UMTS) are required to Advance and/or Retard the transmitted signal. Embodiments of the present invention minimize signal quality degradation incurred when performing an Advance or Retard. The phase of the transmitter clock is gradually shifted over time to perform an Advance or Retard. It does not change the data samples entering the polyphase filter. Rather it changes the rate of the samples entering the filter.

The phase of the radio's TX resampler clocks are constantly adjusted to track the Modem TX data clock. When an Advance or Retard command is received, radio SW is activated to enable the resampler clock phase shift to perform the Advance or Retard. The incremental changes to the resampler clock phase performs an Advance or Retard as a series of small steps. The adjustment rate is programmable. The radio tracks small changes in the modem's data clock continuously. It can detect large phase shifts and conditionally not track them. There are 2 possibilities: 1) track all phase shifts, 2) track small phase shifts, detect large phase shifts (phase shifts in the range of the step size) and only adjust the phase shift for an ADVANCE or RETARD when instructed to by a command.

The UMTS standard specifies a maximum ¼ chip Advance/Retard Step Size per 200 ms, but various embodiments perform additional step-sizes of ⅕ chip per 160 ms and ⅛ chip per 100 ms, for example.

Figure 1:
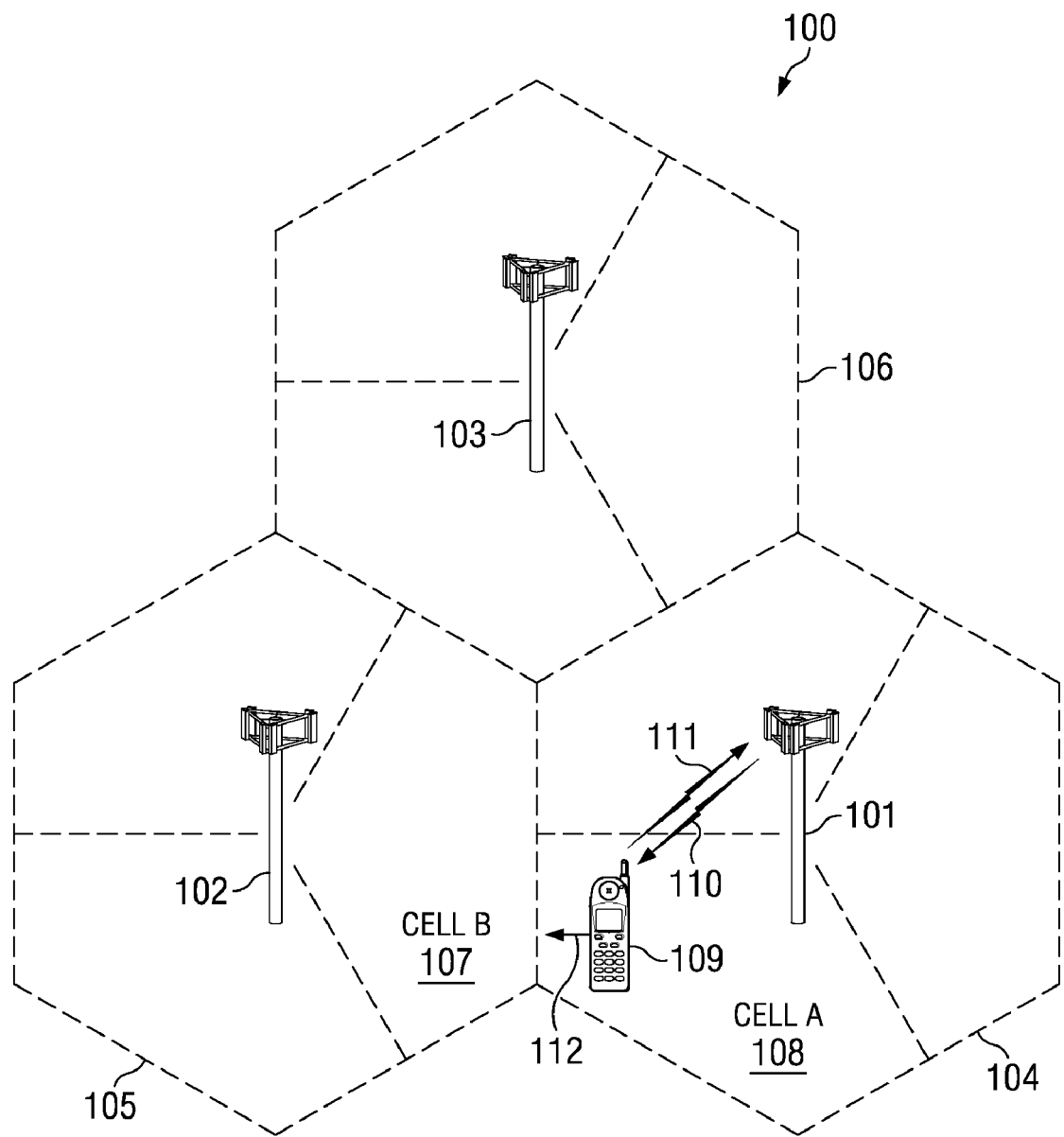
FIG. 1 is a pictorial of an illustrative telecommunications network that employs an embodiment of fractional interpolative timing advance and retard control in transceivers used in the network.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. A UE in a cell may be stationary such as within a home or office, or may be moving while a user is walking or riding in a vehicle. UE 109 moves within cell 108 with a velocity 112 relative to base station 102.

In one embodiment, UE 109 is transmitting to and receiving from base station 101 voice and/or data transmissions. NodeB 101 may send a command to UE 109 to request advance/retard operation, which is required by the 3G standard to maintain system-level synchronization in the presence of Doppler effects and other drifts induced over time, as will be explained in more detail below.

To aid in understanding the principles of the present invention, a description is provided in the context of a digital RF processor (DRP) transmitter and receiver that may be adapted to comply with a particular wireless communications standard such as GSM, Bluetooth, WCDMA, etc. It is appreciated, however, that the invention is not limited to use with any particular communication standard and may be used in control, optical, wired and wireless applications. Further, the invention is not limited to use with a specific modulation scheme but is applicable to any modulation scheme including both digital and analog modulation.

Note that throughout this document, the term communications device is defined as any apparatus or mechanism adapted to transmit, or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. The notation DRP is intended to denote either a Digital RF Processor or Digital Radio Processor. References to a Digital RF Processor infer a reference to a Digital Radio Processor and vice versa.

Figure 2:
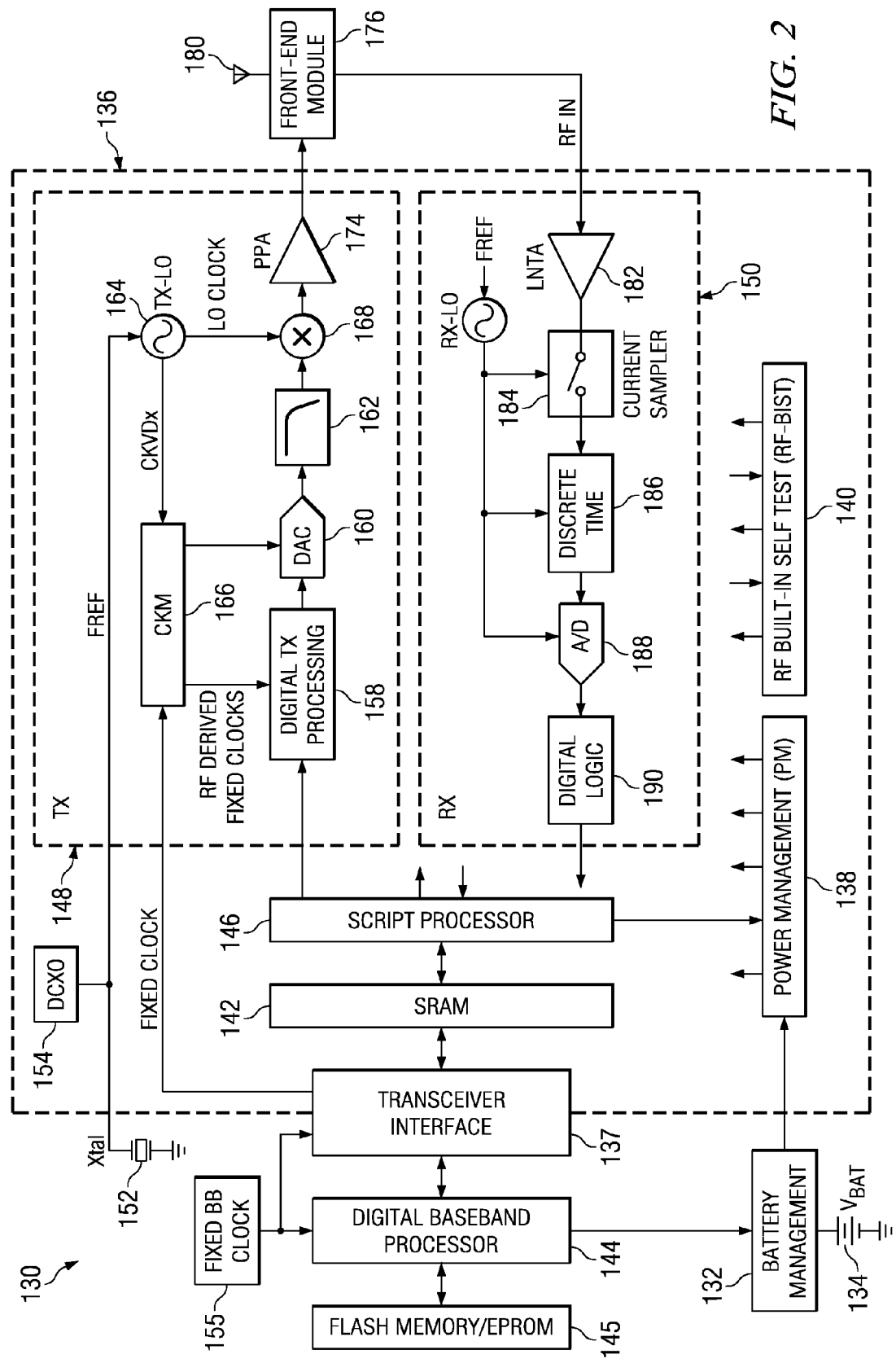
FIG. 2 is a block diagram of a single-chip radio with an all-digital local oscillator and transmitter and a discrete-time receiver that embodies interpolative timing advance and retard control.

A block diagram illustrating a single chip radio incorporating an interpolative all-digital local oscillator based Cartesian transmitter and digitally-intensive receiver is shown in FIG. 2. For illustration purposes only, the transmitter, as shown, is adapted for the EDGE/WCDMA cellular standards. It is appreciated, however, that one skilled in the communication arts can adapt the transmitter illustrated herein to other modulations and communication standards as well without departing from the spirit and scope of the present invention. This embodiment of a DRPu for UMTS is a Digital RF Processor (DRP)-based dominantly digital transceiver integrated with a digital baseband processor in 45 nm CMOS technology. This DRPu EDGE/WCDMA (2.5G/3G) transmitter (TX) is based on a Cartesian (I/Q) direct up-conversion TX architecture with digital assistance for calibrations and compensation, henceforth termed as a Digitally Assisted analog I/Q (DAIQ) TX. For GSM (2G), the transmitter architecture is small-signal analog polar. DRP supports interface with both multi-mode and multi-band power amplifiers (PA).

The radio circuit, generally referenced 130, comprises a transceiver integrated circuit (IC) 136 coupled to a crystal 152, antenna front end module 176 connected to antenna 180 and battery management circuit 132. The radio chip 136 comprises a script processor 146, memory 142 (e.g., static RAM), transmit (TX) block 148, receiver (RX) block 150, digitally controlled crystal oscillator (DCXO) 154, slicer 156, power management unit 138, RF built-in self test (BIST) 140. Battery 134 and battery management circuit 132 are connected to radio chip 136 for providing power. Digital baseband (DBB) processor 144 and flash memory/EEPROM 145 is coupled to transceiver IC 136 via transceiver interface 137.

The TX block 148 comprises high speed and low speed digital logic block 158, digital to analog converter 160, low pass filter 162, amplitude modulator 168, digitally controlled oscillator (DCO) 164, digitally controlled pre-power amplifier 174. The transmitter generates various radio frequency signals, as defined by the 3GPP specifications. For example, the transmitter may support one or more of the 3G UMTS frequencies: 850, 900, 1700, 1900, or 2100 MHz.

A key component of transmitter block 148 is digitally controlled oscillator (DCO) 164, that is part of an interpolated-digital phase-locked loop (ADPLL). DCO 164 avoids any analog tuning controls. The DCO generates a high-quality base station-synchronized frequency reference such that the transmitted carrier frequencies and the received symbol rates are accurate to within 0.1 ppm. Fine frequency resolution is achieved through high-speed sigma-delta ($\Sigma\Delta$) dithering of its varactors. Digital logic built around the DCO realizes an interpolated all-digital PLL (ADPLL) that is used as a local oscillator for the transmitter. The Cartesian transmitter architecture utilizes a digitally controlled power amplifier (DPA) 174 for the amplitude modulation. It is followed by a matching network and an external antenna front-end module 176, which comprises a power amplifier (PA), a transmit/receive switch for the common antenna 180 and RX surface acoustic wave (SAW) filters.

An advanced All-Digital PLL (ADPLL) frequency synthesizer is described in US Patent application 2008-0315960 to Waheed et al entitled "Digital Phase Locked Loop with Gear Shifting" which is incorporated by reference herein in its entirety.

Fixed baseband clock circuit 155 provides a fixed clock to DBB processor 144 and to transceiver interface 137. Clock module 166 receives a variable clock from DCO 164 and produces a set of synchronized RF derived clocks for use by digital processing module 158 and DAC 160. Clock module 166 also receives a clock signal from transceiver interface 137 that is used to allow synchronization of clocks between fixed clock 155 and variable clocks derived from DCO 164.

The receiver employs a discrete-time architecture in which the RF signal is directly sampled and processed using analog and digital signal processing techniques. RX block 150 comprises a low noise transconductance amplifier 182, current sampler 184, discrete time processing block 186, analog to digital converter (ADC) 188 and digital logic block 190. The receiver 150 employs a discrete-time architecture in which the RF signal is directly sampled at the Nyquist rate of the RF carrier and processed using analog and digital signal processing techniques. The transceiver is integrated with a script processor 146, dedicated digital base band processor 144 (i.e. ARM family processor and DSP) and SRAM memory 142. The script processor handles various TX and RX calibration, compensation, sequencing and lower-rate data path tasks and encapsulates the transceiver complexity in order to present a much simpler software programming model.

The frequency reference (FREF) is generated on-chip by a 38.4 MHz (but could be 26.0 MHz or another frequency in another embodiment) digitally controlled crystal oscillator (DCXO). An integrated power management (PM) system is connected to an external battery management circuit 132 that conditions and stabilizes the supply voltage. The PM comprises a switched mode power supply (SMPS) as well as multiple low drop out (LDO) regulators that provide internal supply voltages and also isolate supply noise between circuits, especially protecting the DCO. The SMPS is used for efficient conversion of the battery voltage to a level that can be used by on-chip LDOs. The RF built-in self-test (RFBIST) 140 performs autonomous phase noise and modulation distortion testing, various loopback configurations for bit-error rate measurements and implements various DPA calibration and BIST procedures.

In another embodiment, the transceiver may be integrated with the digital baseband processor 144 and flash memory 145 memory in a complete system-on-chip (SoC) solution.

Figure 3:
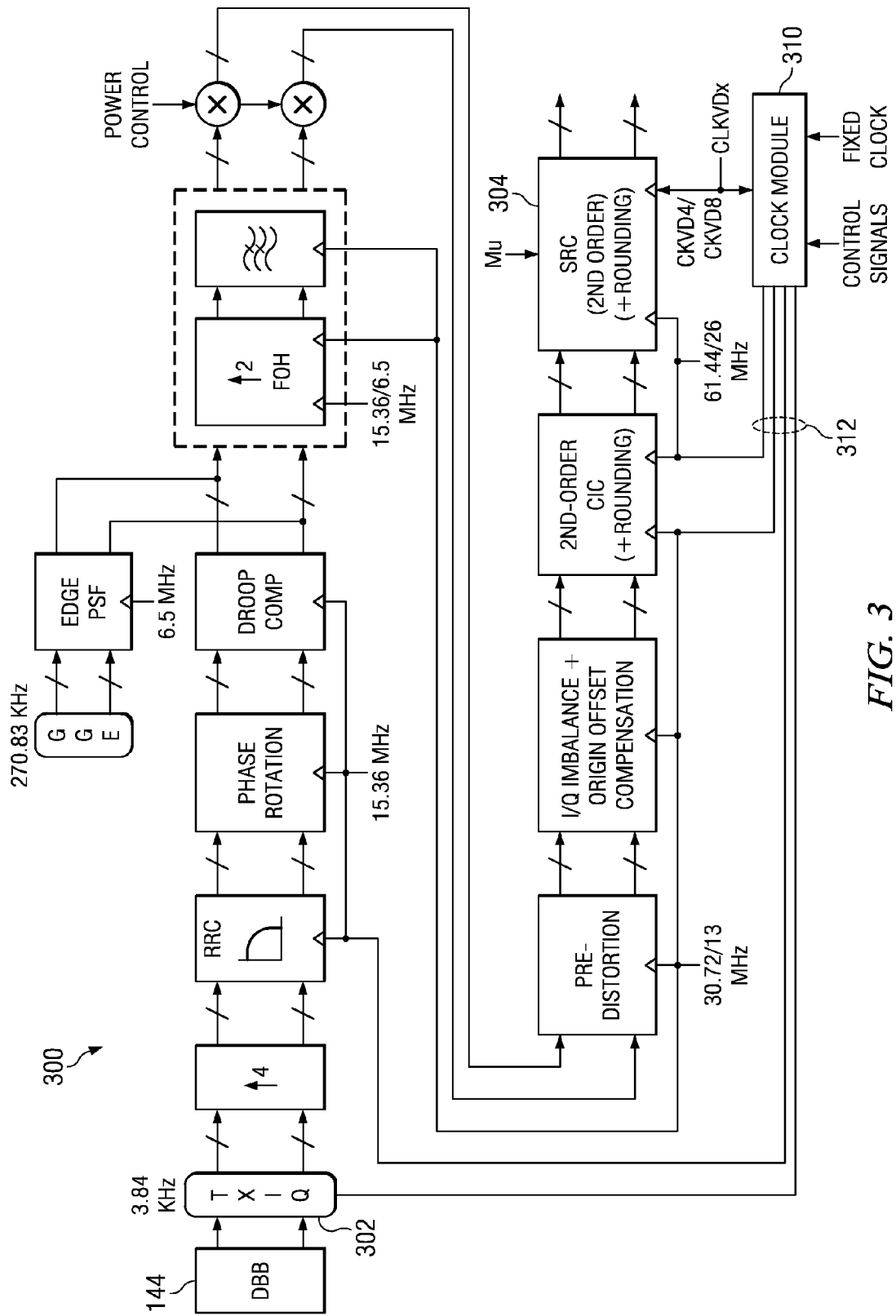
FIG. 3 is a more detailed block diagram of a digital transmitter (DTX) portion of the digital processing block of the radio of FIG. 2.

FIG. 3 is a more detailed block diagram of a portion of the digital processing block 158 of the DRP of FIG. 2 that is referred to as the digital transmitter (DTX) 300 sub-block. The DTX sub-block of the 2G/3G DRP transmitter transforms the baseband I/Q data received from DBB 144 to the input of the digital to analog converter (DAC) embodied by the iADPLL while meeting requisite TX performance. The DAC as embodied by the iADPLL is also referred to as interpolated Analog transmitter (ATX). In addition, DTX also performs a number of baseband signal processing operations on the I/Q data to mitigate possible analog artifacts in the ATX. Thus, the complete transmitter has a digital portion DTX and an analog portion ATX.

DBB/DTX Interface and the DTX Clocks

Clock module 310 of the DTX provides all DTX clocks, illustrated generally at 312, by dividing the CKVDX clock. The CKVDX signal is a variable clock signal that is generated by the iADPLL and its frequency depends on the particular band and channel on which the DRP is transmitting. In WCDMA mode, the output of the sample rate conversion (SRC) block 304 and the DAC are running at CKVD4 and other DTX blocks are running at a fixed-frequency clocks which is the integer multiple of the chip rate (3.84 MHz). The SRC block acts as the bridge of the fixed-frequency clock domain to the CKVDX clock domain. Mu, represents the relative location of the CKVD clock edges and the fixed-frequency (61.44 MHz in WCDMA mode) clock edges, is required for the SRC to perform the sampling rate conversion.

The incoming I/Q data for the 3G TX for the DRP transmitter is received from the DBB interface using transmitter I/Q (TXIQ) interface 302. This interface is driven by an independent DBB clock from fixed clock module 155. This clock is different from the chip rate (and multiples) clocks derived from the iADPLL in the DRP. As shown in FIG. 4, in the normal operation, the DBB (or through the hardware adaptation layer) provides BB_CLK4X (may be 5×, 10×), and the chip rate I/Q data. For synchronization purpose, a BB_DATVAL signal is always provided to indicate when the I/Q data is ready to be sampled.

The chip rate of a code is the number of pulses per second (chips per second) at which the code is transmitted (or received). For example, in 3G systems the chip rate is larger than the symbol rate, meaning that one symbol is represented by multiple chips. The ratio is known as the spreading factor (SF) or processing gain. In other embodiments the chip rate may equal the symbol rate. For this DRP transmitter, the I/Q chip rate data from the baseband is sampled by the chip-rate clock 312 generated by the CKM 310, which is driven by the ADPLL clock. The sampling clock should be aligned with the signal BB_DATVAL to achieve best time margin in the sampling process, which requires the phase/frequency synchronization between the signal DRPu_1X_CLK and the signal BB_DATVAL. The data is first sampled using the BB_CLK4X and BB_DATVAL, then sampled again using the DRPu_1X_CLK.

The baseband may request advance/retard operation, which is required by the 3G standard to maintain system-level synchronization in the presence of various drifts induced over time. The advance/retard operation in the DRP TX can be triggered either automatically by changing the phase of the interface signal BB_DATVAL to advance/retard the signal or by an API command (Software) received from a control processor coupled to the DRPu. In the case where the advance/retard operations are triggered by a separate command, the advance/retard operation may start before or after the BB_DATVAL is advanced or retarded. However, the phase shift requested by the advance/retard command should have a corresponding phase shift of the TX IQ data/BB_DATVAL to limit the instantaneous phase delta to be within ¼ chip period' so that the BB_DATA_I/Q can be properly sampled with a timing margin of ¼ chip period.

In summary, the CKM provides all fixed frequency clocks to the DTX blocks, and Mu for the SRC. The CKM supports two main operations for the advance/retard function: 1) the phase/frequency synchronization of the chip rate clock, derived from the DRPu ADPLL, to the DBB data and/or clock so that I/Q data is passed to the DRPu without any corruption at the interface; 2) restoration of phase/frequency synchronization in response to an advance/retard operation, required by the 3G standard to maintain system-level synchronization in the presence of Doppler effects and other drifts induced over time. Note, the CKM can have other functions not directed at advance/retard operation.

TX Timing Description

The TX RF signal timing advance/retard operation will now be described in more detail. The timing reference for the TX RF signal is defined by the modem TX data clock. The DRP must send the TX signal from the modem interface through the DRP and ultimately to the antenna with near constant latency based on the timing of the modem TX data clock. In the embodiment, the modem function is performed within DBB 144 by executing instructions stored in memory by a digital signal processor (DSP) within DBB 144. In other embodiments the modem may be implemented in software executed by a separate processor, by hardware in a circuit module, or by other known means.

The timing is complicated by potential jitter in the modem TX data clock. The DRP must support 2 general cases; the clock may be generated within the modem independently of the DRP or may be generated by the DRP, but delayed or otherwise changed by the modem. If a modem in generating clocks, jitter may be a result of the means used to generate the clock (e.g. a PLL) or may intentionally be added by dithering or clock spreading.

Another timing complication is that the 3GPP spec requires that the TX signal timing be advanced or retarded as necessary to keep the TX Slot boundary at a nominal 1024 chip offset from the RX slot. The spec allows the TX signal to be advanced/retarded by ¼ chip per 200 ms.

This embodiment of the DRPu supports the following advance/retard options, however other embodiments may support other shift amounts:

¼ chip per 200 ms
⅕ chip per 160 ms
⅛ chip per 100 ms

Modems typically support advance (retard) by increasing (decreasing) the rate of the TX I/Q samples at the modem interface instantaneously by a particular amount (e.g. by ⅛, ⅕ or ¼ chip). They typically do this by using a higher frequency clock and delivering the data sooner (or later) by the advance/retard step size (the step size is typically one or more the higher frequency clock periods.

The DRP uses fixed frequency clocks (DRPu TX resampler clocks, such as the DRPu_1X_CLK and other higher frequency versions of this clock) derived from its Local Oscillator (DCO) 164 via clock module 310 to drive the front-end of the DRP transmitter. The lowest frequency DRPu TX resampler clock 312 is a 1X chip rate clock (DRPu_1X_CLK) and is used to clock 3G I/Q data into the RRC filter at chip rate. The frequency of the DRPu CK1X and the modems TX data clock must be the same. Other DRPu TX resampler clocks at higher frequencies are used to support the design. When this document refers to DRPu TX Resampler Clock alignment it is referring to aligning the DRPu_1X_CLK clock to the modems TX data clock with the desired phase and also aligning all other higher frequency DRPu TX resampler as required by the design.

The DRP supports advance/retard by aligning the DRPu_1X_CLK clock with the modems TX data clock. The phase alignment mechanism accomplishes the following three functions:

1. Guarantee initial latency from the Modem TX interface to the antenna.
2. Keep the resampler clock frequency locked to the modem TX interface clock frequency.
3. Advance/retard the TX signal to support the 3GPP advance/retard requirement.

Figure 5:
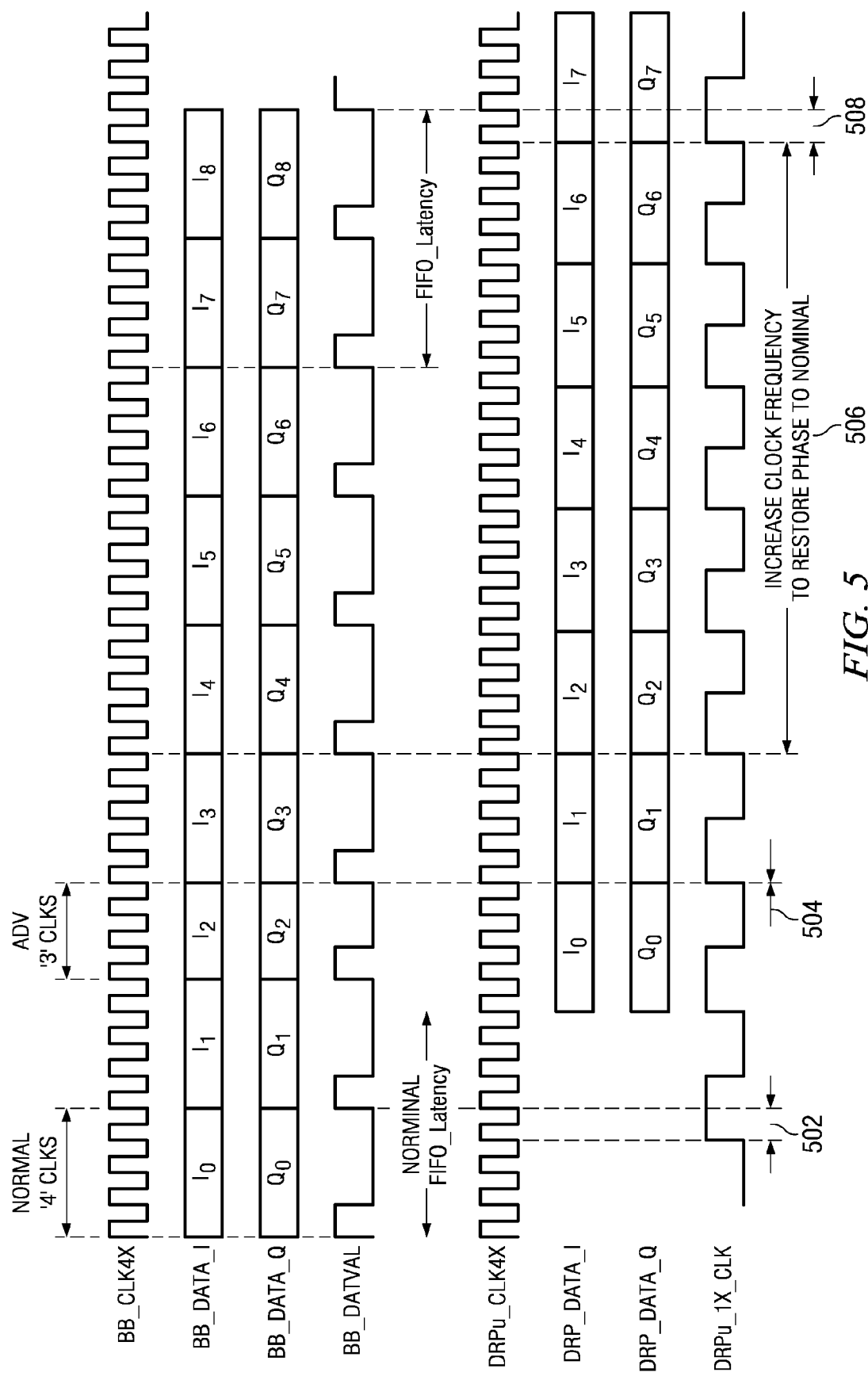

FIG. 5 is a timing plot illustrating automatic advance/retard mode. The modem operates on clock signal BB_CLK4X which is four times the chip rate. The I and Q data is provided by the modem on signals BB_DATAI and BB_DATAQ. The BB_DATVAL signal indicates when the I/Q data is valid. Within the DTX block, DRPu_CLK4X is the primary clock signal. TX interface 302 contains a FIFO to buffer the modem I/Q data. The modem I/Q data from the output of the FIFO is resampled by the DRPu_CLK1X clock signal to produce DRP I/Q data DRP_DAT_I and DRP_DATA_Q.

The initial latency of the I/Q data signals through the DRPu is set by the initial alignment of the DRPu resampler clock during the TX ON script, as controlled by script processor 146. The resampler clock frequency remains locked automatically while transmission is in progress by making frequent and small adjustments to the phase alignment within clock module 310. While the goal is to maintain a fixed phase relationship, there will be instantaneous variations, but on average the phase relationship will be fixed at the specified phase relationship. When the DRPu starts an advance/retard depends on the mode of operation. Two modes are be supported; Automatic Advance/Retard Mode and Parameter Driven Advance/Retard Mode. Automatic Advance/Retard Mode is driven by the TX data interface and essentially combines items 2 and 3 above. That is, the DRP corrects frequency drift and performs advance/retard by continuously maintaining a fixed phase alignment of the modem TX data clock and the DRPu TX resampler clocks. In Parameter Driven Advance/Retard Mode, the DRPu controls frequency drift correction separately from advancing/retarding the data.

Automatic Advance/Retard Mode

In this mode, the modem requests an advance or retard by advancing or retarding the baseband data valid (BB_DATVAL) signal at the TX data interface. Depending on the design of the modem, the advance/retard may be in steps of ¼, ⅕, or ⅛ chip. For example, in FIG. 5 the modem operates on a clock signal BB_CLK4X that is four times the chip rate. In this case, the modem can advance/retard BB_DATVAL by ¼ of a chip. If the modem was designed to operate on a clock signal that is five times the chip rate, then the modem could advance/retard BB_DATAVAL by ⅕ of a chip. Similarly for ⅛ of a chip. No API parameters are used to perform an advance or retard when in Automatic Advance/Retard Mode. When the TX is active, all control is performed by hardware. During TX ON, the DRP will perform an initial alignment of the DRP resampler clock (DRPu_CLK1X) to the Modem TX data clock.

The DRP will constantly monitor the phase of the TX signal and realign the resampler clocks automatically to maintain the correct phase alignment. The DRP will advance or retard the TX signal by gradually increasing or decreasing the frequency of the DRPu_1X_CLK clock until the desired phase alignment is restored. The initial phase alignment and the rate of adjustment of the resampler clock frequency are configurable.

Figure 6:
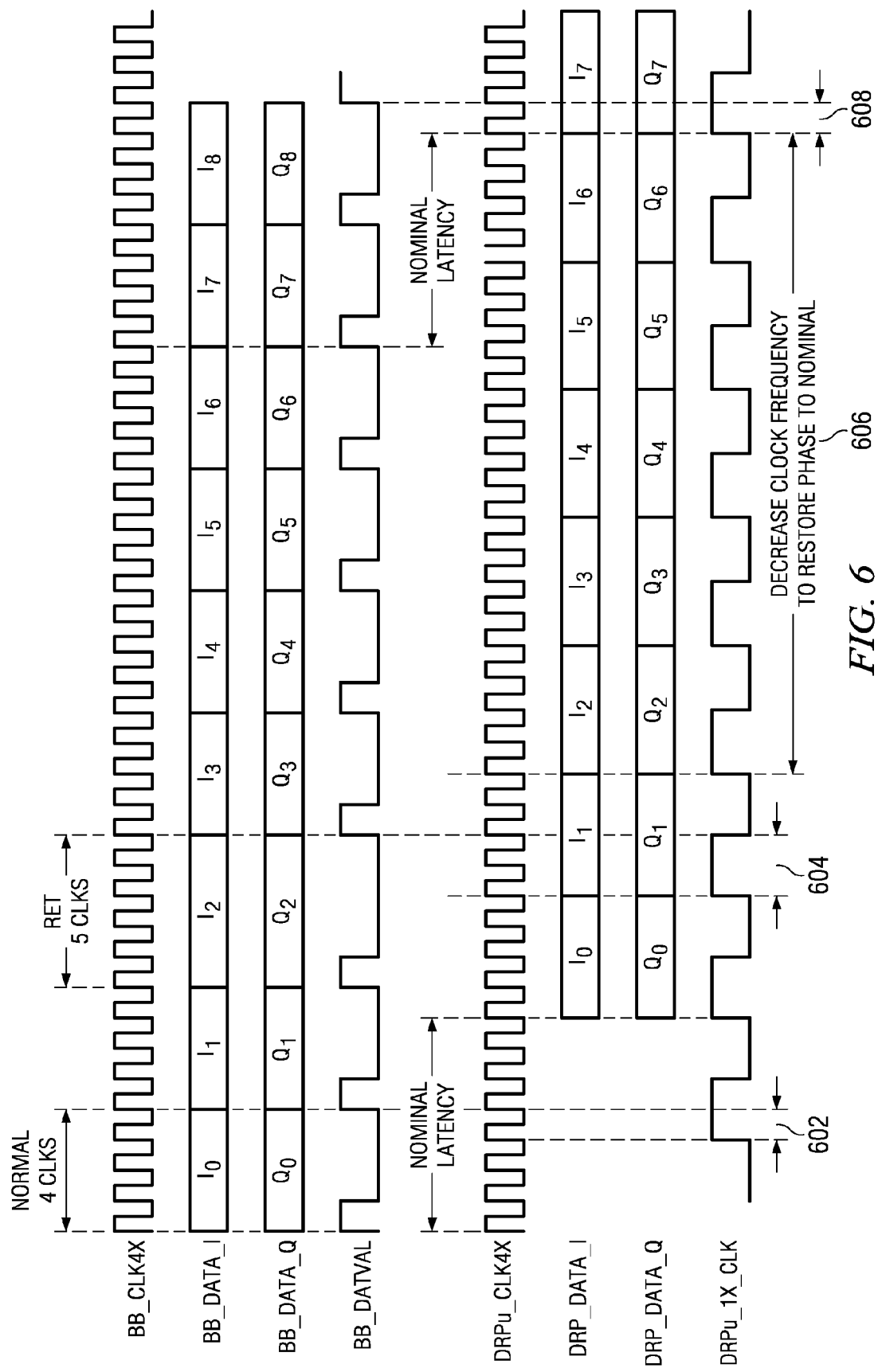

FIG. 5 shows a timing diagram for an advance. FIG. 6 shows a timing diagram for a retard. Each of these figures shows an initial alignment 502, 602 of the DRPu_CLK1X to the modem's data valid and clock. When an advance is performed, the modem causes the BB_DATVAL signal and the I/Q data to arrive earlier by one period of the BB_CLK4X signal. The DRP detects 504 the change in phase between the DRPu_CLK1X signal 312 and the BB_DATVAL signal from the modem. The DRPu resampler clock frequency is increased by a small amount to realign the clock phases after the advance at the bus interface. The realignment continues as indicated at 506 until the initial phase of the clocks is restored, as indicated at 508, at which time the DRPu resample clock frequency returns to tracking the modem clock.

Similarly, when a retard is performed, the modem causes the BB_DATVAL signal and the I/Q data to arrive later by one period of the BB_CLK4X signal. The DRP detects 604 the change in phase between the DRPu_CLK1X signal 312 and the BB_DATVAL signal from the modem. The DRPu resampler clock frequency is reduced by a small amount to realign the clock phases after the retard at the bus interface. The realignment continues as indicated at 606 until the initial phase of the clocks is restored, as indicated at 608, at which time the DRPu resample clock frequency returns to tracking the modem clock.

Note that in each case for advance and retard, the phase restoration period 506, 606 extends for a number of periods of the chip rate. In this example the phase restoration period is five chip rate periods. However, since the advance/retard operation can occur no more than once per 200 ms, the phase restoration period may cover a large number of chip rate periods. In this manner, the modem can perform the advance/retard in a simple manner during one period by adding or dropping a single BB_CLK4X period and the DRP can accommodate the advance/retard by spreading the change over a large number of chip periods so that signal distortion on the transmitted signal is minimized.

Parameter Driven Advance/Retard Mode

In this mode, the modem still advances or retards the signal at the TX interface, but also uses an API Advance/Retard parameter (DRP_API_ADVRET) to advance or retard the signal by the amount specified by the parameter. The advance or retard amount specified by the API parameter may be different than the amount at the modem TX interface. For example, a modem may advance/retard the signal at the TX interface by ¼ chip increments, but request ⅛ chip advance/retard increments via DRP_API_ADVRET.

The DRP_API_ADVRET parameter is a signed byte that specifies the fraction of a chip that the TX signal should be advanced/retarded. Positive values request a timing advance; negative values request a timing retard. A value of zero corresponds to a NULL request. E.g. a value of +8 is a request to advance the timing by ⅛ chip. A value of −5 is a request to retard the timing by ⅕ chip. The parameter supports requests in the range of −1/128 to 1/127 and this same range is supported by this embodiment without restriction. However, only parameters values or −8, −5, −4, 0, 4, 5, and 8 are anticipated to be used by a 3G solution. Therefore, in another embodiment the range of this parameter may be restricted, or alternatively the range may be expanded.

When configured for Parameter Driven Advance/Retard Mode, an advance or retard is only initiated by the DRPu when the modem requests the advance/retard via the API parameter. The DRPu polls this parameter periodically while the TX is active and initiates an advance or retard when the parameter is non-zero. The DRP zeros the parameter when it begins performing the requested advance/retard. The rate of requests is limited. I.e. the 3GPP specification limits the rate of advances and retards to ¼ chip per 200 ms. The DRP has a relatively long time to respond to an advance/retard request via the API parameter. The proposed design is not stressed by the potential rate of requests. It is anticipated that DRPu scripts will poll the advance/retard parameter once per TX slot. Polling is done in this embodiment because the timing allows it. Another embodiment may take an interrupt to respond immediately to an advance/retard request.

The modem may request an advance/retard via an API parameter before it advances/retards the data at the TX interface The DRP design must buffer enough TX data to allow the modem to request an advance via the API parameter before it advances the signal at the TX interface. Likewise, the DRP must provided enough buffering to store accumulated data when the modem requests a retard via the API parameter before retarding the signal at the TX interface. A shallow FIFO should be sufficient to meet the buffering requirements. In this embodiment, the FIFO is only two entries.

The DRP will constantly monitor the phase of the TX signal and automatically align the Tx resampler clocks to compensate for drift between the TX data clock and the resampler clocks. It will detect when an advance or retard occurs at the interface so that it can determine what the desired phase alignment between the two clock domains should be. When the DRP receives an API Advance/Retard parameter it will gradually change the phase between the modem's TX data clock and the TX resampler clocks to perform the request. To summarize, the DRP automatically aligns the phase of the resample clocks to account for drift, but only advances or retards the signal when instructed to by an API parameter.

Compress Mode Gap Phase Preservation

The current phase-alignment of the TX signal must be saved when entering a compressed mode gap. The saved phase-alignment must be restored when exiting a compressed mode gap. FIG. 7 provides an example of phase alignment initialization requirements. This requirement applies to both Automatic Advance/Retard Mode and Parameter Driven Advance/Retard Mode. As described above, initial alignment 702 is made by the TX_ON script. An advance is performed as described above at 704 and resampler clock realignment begins at 706. A compressed mode gap is entered at 710 during which the current phase alignment is saved. Once the compressed mode gap is exited at 712, the phase alignment is restored prior to resuming transmission at 714. Eventually the realignment is complete at 708, as described above.

Figure 8:
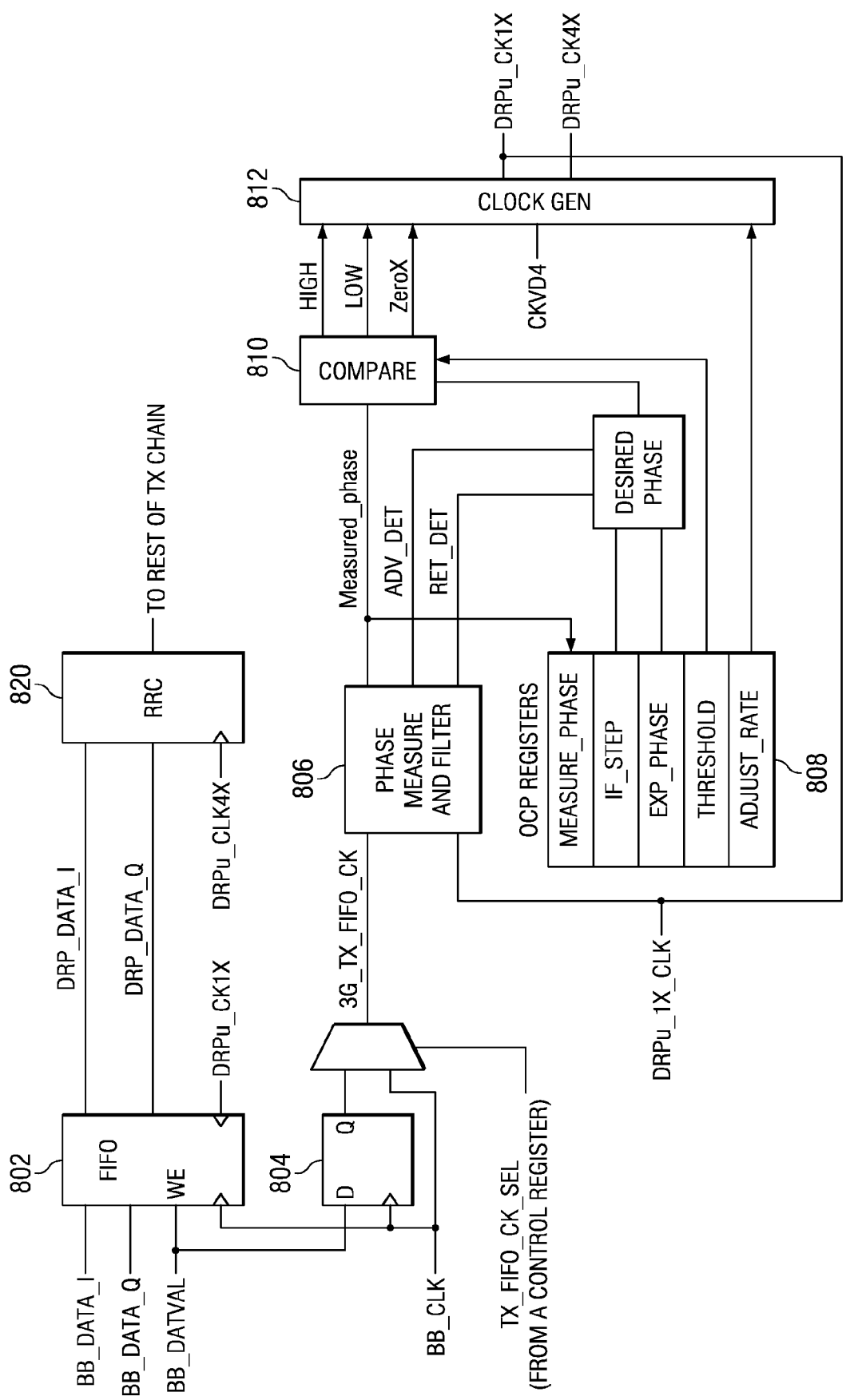
FIG. 8 is a more detailed block diagram of the TX interface for DTX.

FIG. 8 is a block diagram of the DRPu TX interface 302. It is relatively detailed but is not intended to be a schematic. Not all signals are shown in the diagram. The block diagram shows the critical requirements of the interface and illustrates a solution to support TX signal timing.

There is a 3G TX data FIFO 802 within the DRPu. The FIFO in this embodiment is two words deep. The FIFO is not traditional in that the latency through the FIFO needs to appear constant. This requirement includes accounting for jitter or spreading. It is possible to align the TX clock to the resampler clock when dithering or spreading is disabled. Initial FIFO latency can be established most easily while dithering or spreading is disabled. Once the FIFO latency is established and DRPu resampler clock alignment has completed, clock spreading/dithering can be enabled. FIGS. 5 and 6 illustrate nominal FIFO latency.

The BB_DATVAL signal is registered 804 using the modem's data clock BB_CLK to produce the 3G_TX_FIFO_CK signal. The 3G_TX_FIFO_CK signal is the TX signal timing reference. The logic for this function can be internal to the DRP or put in the wrapper. A wrapper solution may be more generic and hence less risky.

The phase measure and filter block 806 measures the difference between the phase of the DRPu_1X_CLK clock and the 3G_TX_FIFO_CK. The measurements are filtered as necessary to remove jitter or account for clock spreading. In this embodiment, the detection is done with respect to the CKVD4 cycles, so the resolution of the phase detection is one period of CKVD4. In addition to measuring the phase difference, this block also detects when an advance or retard occurs at the interface. Only a relatively large change (e.g. ⅕ or larger) needs to be detected, otherwise a smaller phase difference is treated as normal jitter. The measured phase can be read from the MEASURE_PHASE register of register set 808 by the DRPu Script Processor to support phase preservation across a CM Gap.

The measured phase is compared to a desired phase as shown in the block diagram. The desired phase is determined by the EXP_PHASE register and the IF_STEP register of register set 808. The EXP_PHASE register holds the expected phase difference between the DRPu TX resampler clock and the modem TX data clock. The EXP_PHASE is set by Script Processor software. The parameters may be stored in register set 808 by the script processor, for example.

The IF_STEP register is configured based on the modem's TX interface advance/retard step size and on the mode of operation (i.e. automatic or parameter driven mode). When in Automatic Advance/Retard Mode, the IF_STEP register is set to ZERO. When in Parameter Driven Advance/Retard Mode the IF_STEP register is set to advance/retard step size at the modem TX interface. For example, if the modem does ¼ chip advance/retard, then IF_STEP is set to indicate ¼ chip.

As mentioned above, the IF_STEP register is set to ZERO for Automatic Advance/Retard Mode. This means the desired phase will always be the expected phase. When an advance or retard is detected at the modem TX data interface, the compare block will detect a phase misalignment and start correcting the alignment immediately.

When in Parameter Driven Advance/Retard Mode, the IF_STEP size is used to update the desired phase to a new desired value whenever an advance or retard is detected at the modem TX interface. This allows the control loop to track frequency drift and correct for it, but to not respond to an advance/retard at the interface until directed to do so by the API parameter.

The compare block 810 compares the measured phase to the desired phase. If they differ by more than the threshold register of register set 808 then either the HIGH or LOW signal is activated. HIGH is activated when the measured_phase is greater then the desired_phase by more than the threshold. LOW is activated when the measured_phase is less then the desired_phase by more than the threshold. The ZeroX signal pulses when the phase difference crosses ZERO. This signal can be used to determine when correction should be applied to the DRPu TX resampler clocks.

Clock generator block 812 does the TX resampler clock generation and correction. Clock generator block 812 illustrates an embodiment of clock module 310 of FIG. 3. The DRPu_1X_CLK and DRPuCK4X signals are shown. Additional clocks may be generated by this block as well. Clock generator block 812 uses the ADJUST_RATE register in register set 808 and Compare block 810 outputs to determine when and how fast to correct clocks. The ADJUST_RATE parameter has a fine enough granularity to allow correction to be as slow as ¼ chip per 100 ms (~2X the 3GPP fastest rate). The correction must also be fast enough to allow a quick phase alignment during TX_ON.

The DRP_DATA_I and DRP_DATA_Q signals from FIFO 802 are clocked into RRC filter 820 at the chip rate and then sent to the rest of the transmit chain as illustrated n FIG. 3.

Figure 9A:
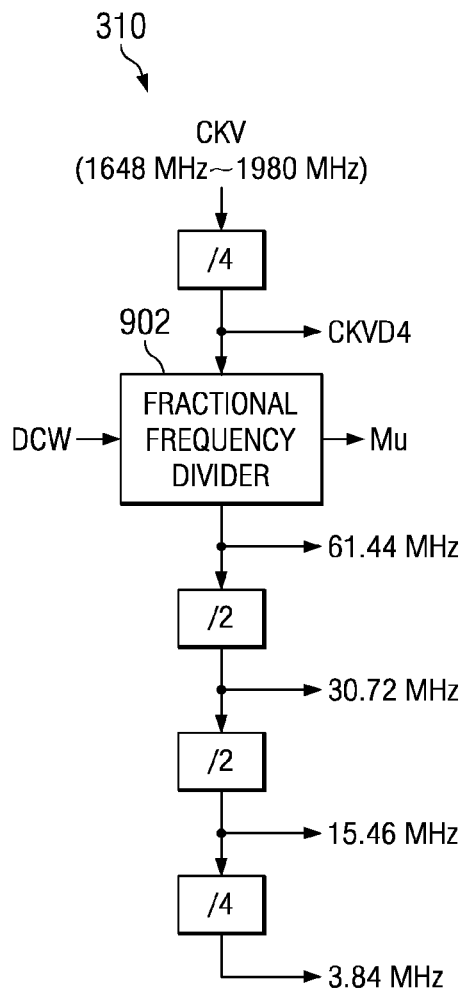
FIG. 9A and 9B together is a more detailed block diagram of an embodiment of the clock module of FIG. 3.

FIG. 9A is another example of an embodiment of the clock module 310 of FIG. 3. The first stage 902 of the CKM is a fractional driver with the ratio controlled by a divider control word. The DCW defines the ratio of the output frequency and the input frequency and is set by the script processor based on the band and channel being used by the DRPu. Both the phase/frequency synchronization and the advance/retards operations are achieved by dynamically tuning the DCW.

detected phase difference is compared with the desired phase offset to determine the phase error, which is filtered and used to tune the DCW with the phase tracking filter.

When the Adv/Ret operation is needed, the Adv/Ret controller generates an Adv/Ret request based on either the shift of the "BB_DATVAL" pulse (when Mode=1) or a separate command (when Mode=0). In this embodiment, to reduce the hardware cost, the actual operation of the Adv/Ret is done in the script processor. The phase tracking path is turned off once an Adv/Ret request is queued (Flag_Adv/Ret is one). Whenever Flag_Adv/Ret is set, the processor reads the Adv/Ret_step (the desired phase step), calculates and applies a certain offset to the DCW for a certain period of time. Once the Adv/Ret operation is done, a positive pulse is written to "Flag_reset" to clear the Adv/Ret request, and "Track_en" to resume the phase tracking operation.

Clock module 310 first does fractional frequency division (with division ratio of Fckvd4/61.44 MHz) to generate a 61.44 MHz clock for the input of the SRC 304. With the output of the fractional frequency divider, other fixed-frequency clocks can be easily generated by integer division.

Figure 9B:
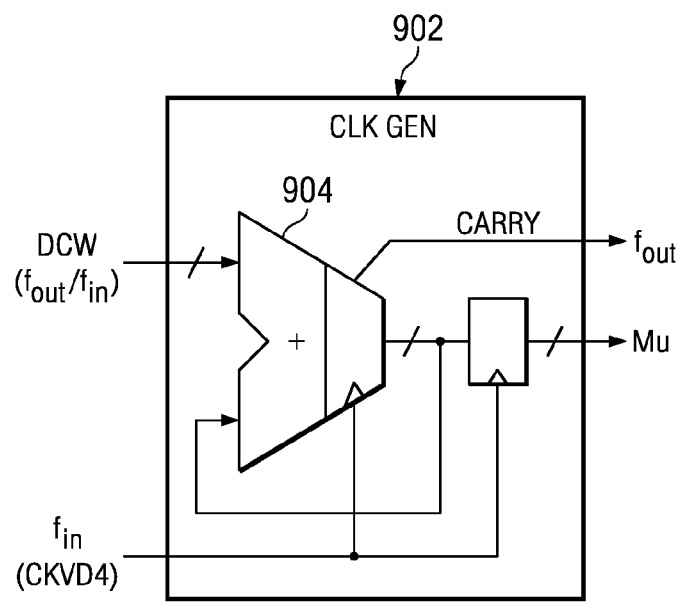

FIG. 9B is a detailed block diagram of fractional frequency divider 902 and the Mu generation. The DCW (division control word of the fractional frequency divider), which is the ratio of the output and input frequencies, is accumulated 904 on input clock (CKVD4) edges. DCW (0<Fcw<1) is represented by a nine-bit unsigned fixed-point number. The output range of the accumulator is 0~1, and the carry bit, which is high whenever the accumulated value goes above '1', has its average frequency equal to the desired output frequency and is used as the output of the fractional frequency divider. The accumulator output is resampled by the input clock to generate the Mu.

To support different operation modes, such as EDGE and GSM, the clock mode is made to be programmable, which in this embodiment supports six different modes as listed in Table 1. The fractional divider always operates at the rate of the CKVD4 and the Mu is updated only on the rate of CKVD4/8/16/32 for different modes, which is achieved by re-sampling the accumulator output as shown in FIG. 9B by the signal "Out0", instead of sampling it only by CKVD4.

TABLE 1

The operation modes of the multi-mode clock module

| | | Mode | | | | | |
|---|---|---|---|---|---|---|---|
| | | WCDMA | | EDGE | | GSM | |
| | | Mode No: | | | | | |
| | | 1 | 2 | 3 | 4 | 5 | 6 |
| Inputs | Fcw | 61.44M/CKVD4 | | | | 52M/CKVD4 | |
| | Clkin | CKVD4 | | | | | |
| Outputs | Out0 | CKVD4' | CKVD8' | CKVD4' | CKVD8' | CKVD16' | CKVD32' |
| | Out1 | 61.44M | 61.44M | 52M | 52M | 52M | 52M |
| | Out2 | 30.72M | 30.72M | 13M | 13M | 13M | 13M |
| | Out3 | 15.36M | 15.36M | 6.5M | 6.5M | 6.5M | 6.5M |
| | Out4 | 3.84M | 3.84M | 270.83k | 270.83k | 270.83k | 270.83k |
| | Out5 | | | 26M | 26M | 26M | 26M |
| | Out6 | TBD | TBD | TBD | TBD | TBD | TBD |
| | Mu | | | Out1→Out0 | | | |

When there is no Adv/Ret operation, the phase/timing difference between the signal "BB_DATVAL" and the chip rate clock (from CKM) is detected by the phase detector, which has a timing resolution equal to one period of CKVD4. The The complete system design is a combination of the DRPu HW and Script Processor Firmware which is stored in SRAM 142, as illustrated in FIG. 2. Table 2 contains an example of pseudo-code for the Automatic Advance/Retard Mode for a modem, while Table 3 contains an example of pseudo-code for the Parameter Driven Advance/Retard Mode for a modem that does ¼ chip advance/retard at the interface. The reader should refer to the block diagram in FIG. 8 to better understand this pseudo-code.

TABLE 2

Automatic Advance/Retard Mode Pseudo-code Description

```
// adjust_size is a register that determines how fast the phase shifting
// occurs during alignment
// exp_phase is a register that sets the desired phase alignment
// measured_phase is a register that contains the most recent phase
measurement.
// if_step determines how the desired phase should be adjusted as
// advance/retard is detected at the interface.
if_step = 0
// threshold determines how much mismatch needs to occur before
correction is applied.
Threshold = 1/20 chip
// store phase across CM Gaps.
static last_phase = DEFAULT_PHASE // maybe default of ½ chip
(180 degrees)
    TX_ON {
        // clock dithering/spreading is disabled (or can be ignored)
        start_and_lock_adpll( )
        enable_resampler_clocks( )
        if(exit_compressed) exp_phase = last_phase
        else exp_phase = DEFAULT_PHASE
        // quickly align phase with coarse adjustment
        adjust_size = FAST_ADJUST
        wait(FAST_ALIGN)
        // make final alignment with fine adjustment
        correct_size = SLOW_ADJUST
        wait(SLOW_ALIGN)
        // set for tracking
        correct_size = TRACK_ADJUST
        enable_resampler_clocks( )
        // enable dithering later
        rest_of_TX_ON( )
    }
    TX_OFF {
        // save current phase if entering compressed mode.
        if(enter_compressed) last_phase = read(measured_phase)
    }
}
```

TABLE 3

Parameter Driven Advance/Retard Mode Pseudo-Code Description

```
// adjust_size is a register that determines how fast the phase shifting
occurs during alignment. exp_phase is a register that sets the desired
phase alignment.
measured_phase is a register that contains the most recent phase
measurement.
// if_step determines how the desired phase should be adjusted as
advance/retard is detected at the interface if_step = ¼ chip
// threshold determines how much mismatch needs to occur before
correction is applied.
Threshold = 1/20 chip
// store phase across CM Gaps. static last_phase = DEFAULT_PHASE
// may be default of ½ chip (180 degrees)
    TX_ON {
        // clock dithering/spreading is disabled (or can be ignored)
        start_and_lock_adpll( )
        enable_resampler_clocks( )
        if(exit_compressed) exp_phase = last_phase
        else exp_phase = DEFAULT_PHASE
        // quickly align phase with coarse adjustment
        adjust_size = FAST_ADJUST
        wait(FAST_ALIGN)
        // make final alignment with fine adjustment
        correct_size = SLOW_ADJUST
        wait(SLOW_ALIGN)
        // set for tracking
        correct_size = TRACK_ADJUST
        enable_resampler_clocks( )
```

TABLE 3-continued

Parameter Driven Advance/Retard Mode Pseudo-Code Description

```
        // enable dithering later
        rest_of_TX_ON( )
    }
    TX_OFF {
        // save current phase if entering compressed mode.
        if(enter_compressed) last_phase = read(measured_phase)
    }
    TX_BACKGROUND {
        if(DRP_API_ADVRET) {
            // math that follows is required to not accumulate error.
            exp_phase = exp_phase + 1/DRP_API_ADVRET
            // clear parameter for record keeping.
            DRP_API_ADVRET = 0
        }
    }
}
```

System Example

Figure 10:
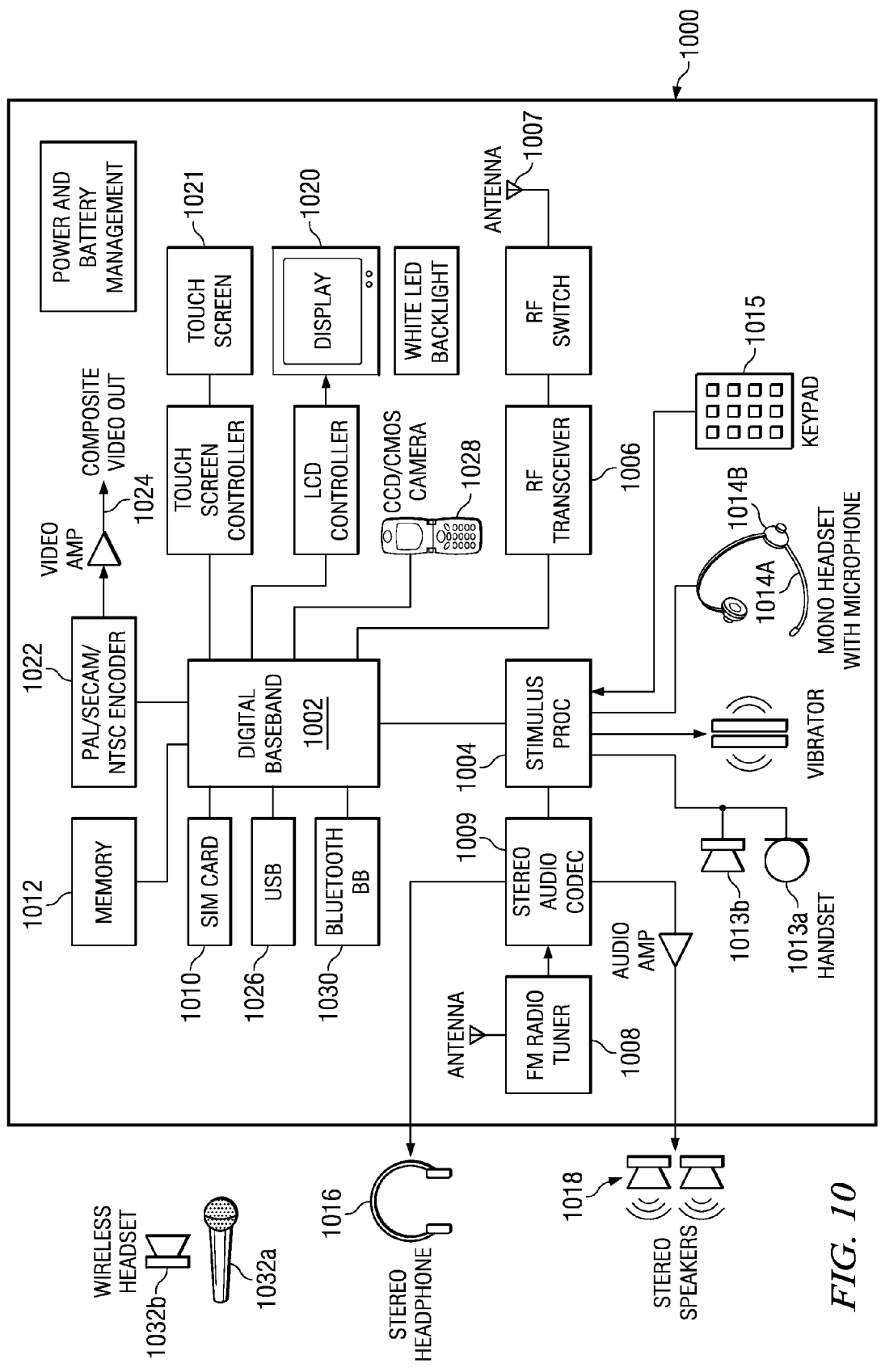
FIG. 10 is a block diagram of a cellular phone for use in the network of FIG. 1.

FIG. 10 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013*a* and sends a voice data stream to handset mono speaker 1013*b*. SP unit 1004 also receives a voice data stream from microphone 1014*a* and sends a voice data stream to mono headset 1014*b*. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. At the heart of transceiver 1006 lies a digitally controlled oscillator (DCO), which deliberately avoids any analog tuning controls. Fine frequency resolution is achieved through high-speed dithering of its varactors. Digital logic built around the DCO realizes an interpolative all-digital PLL (iADPLL) that is used as a local oscillator for both the transmitter and receiver and operates as described above. The polar transmitter architecture utilizes the wideband direct frequency modulation capability of the iADPLL and a digitally controlled power amplifier (DPA) for the power ramp and amplitude modulation. In this embodiment, a single transceiver supports both GSM and WCDMA operation but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by cell phone 1000.

The basic WCDMA DSP radio consists of control and data channels, rake energy correlations, path selection, rake decoding, and radio feedback. Interference estimation and path selection is performed by instructions stored in memory 1012 and executed by DBB 1002 in response to signals received by transceiver 1006. Programmable features of the iADPLL within transceiver 1006 are controlled by instructions executed by DBB 1002.

Embodiments of the present invention minimize signal quality degradation incurred when performing an Advance or Retard, as described in more detail above. The phase of the transmitter clock is gradually shifted over time to perform an Advance or Retard. It does not change the data samples entering the polyphase filter. Rather it changes the rate of the samples entering the filter.

The phase of the radio's TX resampler clocks in transceiver 1006 are constantly adjusted to track the Modem TX data clock in DBB 1002. When an Advance or Retard command is received, radio SW is activated on the script processor in DBB 1002 to enable the resampler clock phase shift to perform the Advance or Retard. The incremental changes to the resampler clock phase performs an Advance or Retard as a series of small steps. The adjustment rate is programmable.

The UMTS standard specifies a ¼ chip Advance/Retard Step Size, but various embodiments perform additional step-sizes of ⅕ chip and ⅛ chip, for example. As described above, any chip size may be accommodated to smoothly perform the advance/retard operation.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc Other Embodiments While the invention has been described with reference to illustrative embodiments, this description is not intended to be construed in a limiting sense. Various other embodiments of the invention will be apparent to persons skilled in the art upon reference to this description.

In the described embodiment, a HW assisted mechanism pertains to the second clock tracking the phase changes in the first clock at a programmable rate. A second mechanism is that the start of phase change is software assisted where the phase changes in the second clock may be initiated by programming registers (mainly rate, direction and amount) in anticipation (or with knowledge of) forthcoming phase changes in clock 1. Due to the above described reasons, the operation may be not only to restore a particular phase change but achieve a programmable phase relationship between the two clocks.

In various embodiments, the adjustment rate may be an absolute rate or a rate based on measured phase error magnitude. The timing can be advanced or retarded in multiple steps of arbitrary fractions of the fraction that is being restored.

In another embodiment, there may be only a hardware mechanism or only a software mechanism to perform all or only a portion of the capabilities described herein.

The UMTS standard specifies a ¼ chip Advance/Retard Step Size, but various embodiments perform additional step-sizes of ⅕ chip and ⅛ chip, for example. As described above, any chip size may be accommodated to smoothly perform the advance/retard operation.

The SRC operation between DTX fixed and variable clock domains is much simplified if these clocks have a known phase relationship. Then, mu (the fractional offset between the fixed clock sample and the variable clock sample) can be used to interpolate between the fixed clock samples to calculate the variable clock sample. Also, there is no uncertainty in the phase of the fixed clock samples with respect to the variable clock samples, so the EVM is minimized. In another embodiment, the modem can potentially use the DTX fixed clock, but it is practically difficult to control precisely the phase of this clock at the modem/transceiver interface due to ASIC methodology, such as clock balancing. In another embodiment, the modem may need to generate clocks independently for other reasons, such as high frequency versions for modem HW. In either case, regardless of whether the modem uses the DTX fixed rate clock or not, an embodiment of the invention may be used.

The transmitter produces a stream periodic data. In this embodiment, the periodic data may represent voice data, graphics data, video data, for example. In other embodiments, the periodic data may represent other sources, as determined by the type of device and the communication standard being used.

In various embodiments, modules described herein may be embodied in hardware, software, or a combination of both. When a module is embodied in software, an embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A system, comprising:
   first circuitry coupled to a first clock source, the first circuitry operable to produce a stream of periodic data synchronized to the first clock source, wherein the first circuitry is operable to selectively change one period by a defined amount;
   second circuitry coupled to a variable clock source, the second circuitry coupled to receive the stream of periodic data from the first circuitry at a rate according to the variable clock source; and
   synchronization circuitry coupled to the first clock source and to the variable clock source, the synchronization circuitry operable to cause the variable clock source to maintain a fixed phase relationship with the stream of periodic data while the data period is uniform, and operable to gradually restore over a number of periods the fixed phase relationship when the one period is changed by the defined amount.

2. The system of claim 1, wherein the defined amount is a fraction of a period, and wherein the periodic data stream is selectively advanced or retarded by the fraction of a period.

3. The system of claim 1, wherein the number of periods is greater than four.

4. The system of claim 1, wherein the synchronization circuitry contains a register to receive a parameter to dynamically configurable the adjustment rate.

5. The system of claim 4, wherein the register for receiving a parameter to dynamically configurable the adjustment rate specifies a size increment for gradually restoring the fixed phase relationship over a number of periods.

6. The system of claim 1, wherein the synchronization circuitry is operable automatically to gradually restore over a number of periods the fixed phase relationship when one period is changed by the defined amount.

7. The system of claim 1, wherein the synchronization circuitry is operable to receive a parameter to cause it to gradually alter over a number of periods the fixed phase relationship by an amount different from the defined amount to produce an altered fixed phase relationship.

8. The system of claim 7, wherein the parameter may be received and the altered fixed phase relationship produced prior to change in the one period of the periodic data stream.

9. The system of claim 7, wherein the synchronization circuitry comprises configurable mode logic and configurable parameter logic, wherein in a first mode the synchronization circuitry is operable automatically to gradually restore over a number of periods the fixed phase relationship when one period is changed by the defined amount, and in a second mode the synchronization circuitry is operable to gradually alter over a number of periods the phase relationship by an amount indicated by a parameter received by the parameter logic.

10. The system of claim 9, further comprising a register to receive a threshold value that is used by the synchronization circuitry to determine when to gradually restore the fixed phase relationship over a number of periods.

11. The system of claim 1 being a data transmission system, wherein the first circuitry is an adaptation layer driven by a modem and the second circuitry is a part of a transmitter.

12. The system of claim 11 being a cellular telephone, wherein the periodic data stream comprises transfer data.

13. A method for operating a system, comprising:
    operating first circuitry synchronized to a first clock source to produce a stream of periodic data at a chip rate,
    operating second circuitry synchronized to a variable clock source to receive the stream of data from the first circuitry at a rate according to the variable clock source;
    maintaining a fixed phase relationship between the variable clock source and the first clock source while the data period is uniform by adjusting the variable clock in response to detected phase errors,
    changing one period of the periodic data by a defined amount; and
    restoring the fixed phase relationship over a number of periods in a gradual manner by changing the frequency of the variable clock by an adjustment amount.

14. The method of claim 13, wherein the defined amount is a fraction of a chip period, and wherein the periodic data stream is selectively advanced or retarded by the fraction of a chip period.

15. The method of claim 13, wherein the adjustment amount is specified by an adjust-rate parameter stored in a configurable register.

16. The method of claim 15, wherein the adjust-rate parameter is configurable.

17. The method of claim 13, further comprising measuring a phase error magnitude between the first clock and the variable clock; and
    wherein the adjustment amount is determined based on the measured phase error magnitude.

18. The method of claim 13, wherein at least a portion of the restoring of the fixed phase relationship is performed prior to changing the one period of the periodic stream of data.

19. The method of claim 13, wherein restoring is performed in multiple steps of a fraction of the defined amount.

20. The method of claim 13, wherein restoring the fixed phase relationship is performed automatically upon detecting a phase difference greater than a threshold amount.

21. The method of claim 13, wherein restoring the fixed phase relationship is performed in response to a command that specifies an amount to adjust the phase relationship via an advance-retard parameter.

22. The method of claim 21, wherein the advance-retard parameter specifies an adjustment amount different from the defined amount of change in the one period of the periodic data to produce an altered fixed phase relationship.

* * * * *